(No Model.)

D. O. MARTIN.
FLOWER POT.

No. 296,028. Patented Apr. 1, 1884.

WITNESSES:
Theo. G. Hoster
C. Sedgwick

INVENTOR:
D. O. Martin
BY Munn & Co
ATTORNEYS.

UNITED STATES PATENT OFFICE.

DANIEL OLIVER MARTIN, OF MARSHALL, ILLINOIS.

FLOWER-POT.

SPECIFICATION forming part of Letters Patent No. 296,028, dated April 1, 1884.

Application filed August 24, 1883. (No model.)

*To all whom it may concern:*

Be it known that I, DANIEL O. MARTIN, of Marshall, in the county of Clark and State of Illinois, have invented a new and Improved Flower-Pot, of which the following is a full, clear, and exact description.

The object of my invention is to provide a new and improved flower-pot, so constructed that a quantity of water will be retained in the lower part of the pot, and at the same time air will have access to and can circulate around the roots of the plant.

Reference is to be had to the accompanying drawings, forming part of this specification, in which similar letters of reference indicate corresponding parts in both the figures.

Figure 1:
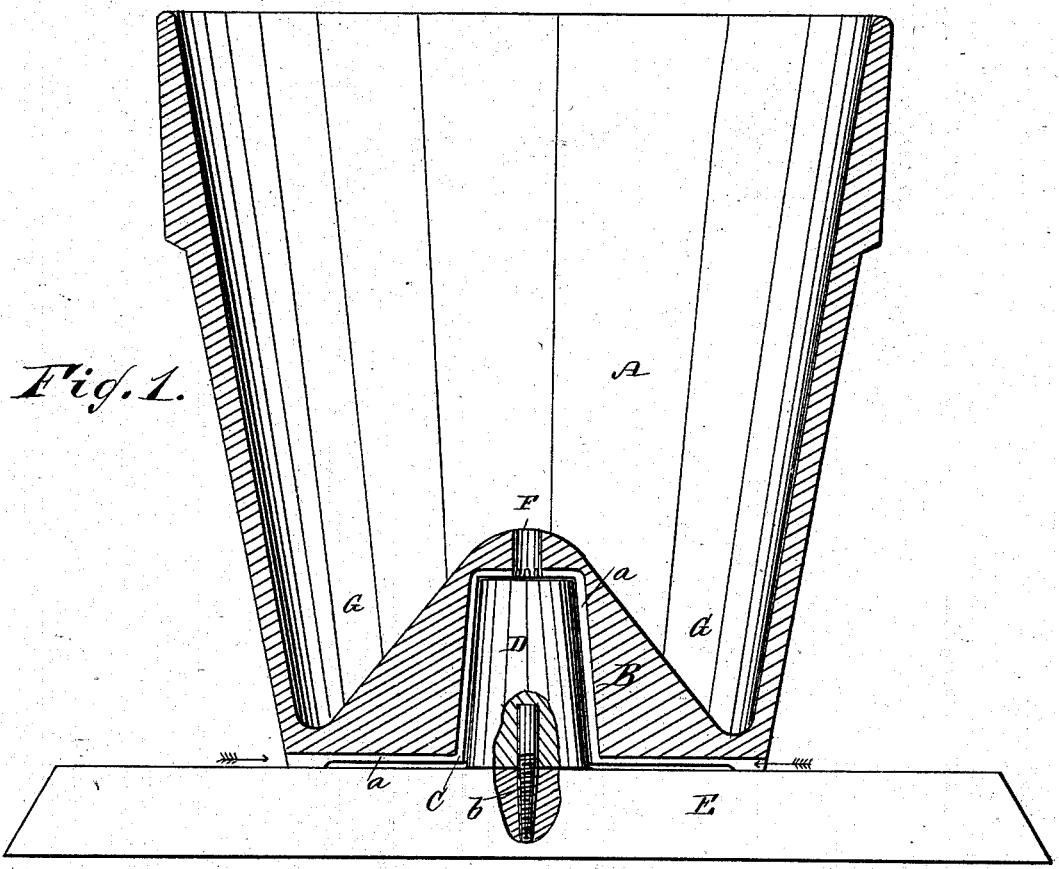
Figure 2:
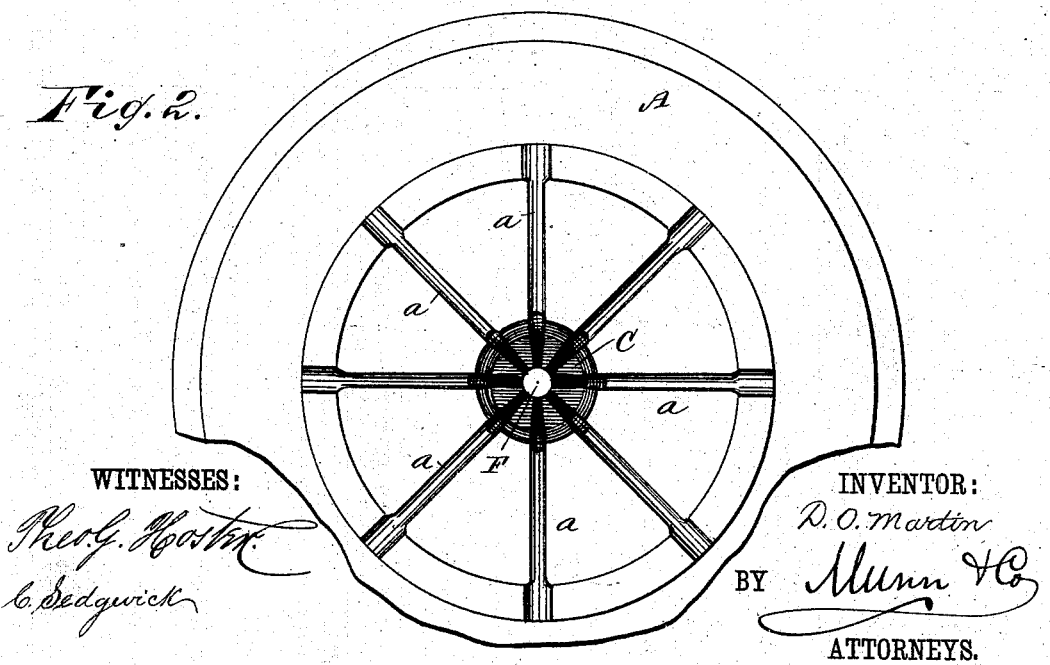

Figure 1 is a cross-sectional elevation of my improved flower-pot. Fig. 2 is an inverted plan view of the under side or bottom of the same.

The pot A is made tapering from the top to the bottom, or cylindrical, as may be desired, and is provided on the upper surface of its bottom with a conical projection, B, in the bottom of which a slightly tapering or other shaped recess, C, is made, which is adapted to receive a pin, D, projecting from the flower stand or shelf E, for the purpose of holding the pot in place and preventing it from being thrown over by top-heavy plants by the wind or accidentally. A smaller aperture, F, extends from the top of the recess C to the top of the conical projection B. Radial grooves $a$, formed in the under side of the bottom of the pot, are continued along the sides and top of the aperture or recess C and lead to the aperture F. If the plants are watered, the water percolates through the earth and collects in the annular pocket G, formed between the sides of the cone B and the sides of the pot. If the level of the water rises above the top of the cone, the surplus water will flow through the apertures F and C. Air passes through the grooves or channels $a$, and passes through the aperture F to the roots of the plants. The roots of the plants will thus at all times have sufficient air and moisture to grow rapidly, as the water in the annular pocket G keeps the ground moist for a long time.

The plants will grow much more rapidly in my improved flower-pot than in the usual pot, in which the water flows off immediately and no means are provided for conducting air into the bottom of the pot.

The pin or peg D can be made of wood or metal, and can be secured on the stand or shelf by means of a screw, $b$, or in any other suitable manner.

If desired, the pot can be held to the shelf by cutting a screw-thread in the outer surface of the pin D and a corresponding thread in the wall of the recess in the bottom of the pot.

Having thus described my invention, I claim as new and desire to secure by Letters Patent—

The combination of the centrally-apertured bottom B of a flower-pot, the plug D in a recess, C, thereof, the screw $b$, fitting a central hole in the bottom of the plug, and a stand, E, into which the screw works, whereby the pot may be secured to its stand without preventing the escape of surplus water, as described.

DANIEL OLIVER MARTIN.

Witnesses:
LEA. A. WALLACE,
H. B. DULANY.